ACCUMULATOR

Inventors:
Clarence L. Coates Jr.,
Philip M. Lewis II.,
by John P. Dellitt
Their Attorney.

Inventors:
Clarence L. Coates Jr.,
Philip M. Lewis II.,
by John P. DeWitt
Their Attorney.

ACCUMULATOR

Filed Nov. 8, 1963 5 Sheets-Sheet 3

Inventors:
Clarence L. Coates Jr.,
Philip M. Lewis II.,
by John P. Dellett
Their Attorney.

Jan. 24, 1967 C. L. COATES, JR., ETAL 3,300,628

ACCUMULATOR

Filed Nov. 8, 1963 5 Sheets-Sheet 4

Inventors:
Clarence L. Coates Jr.,
Philip M. Lewis II.,
by John P. Dellett
Their Attorney.

ACCUMULATOR

Inventors:
Clarence L. Coates Jr.,
Philip M. Lewis II.,
by John P. DeWitt
Their Attorney.

3,300,628

ACCUMULATOR

Clarence L. Coates, Jr., Austin, Tex., and Philip M. Lewis II, Schenectady, N.Y., assignors to General Electric Company, a corporation of New York Filed Nov. 8, 1963, Ser. No. 322,285
12 Claims. (Cl. 235—173)

This invention relates to a storage device for computers and particularly to such a device combining the functions of storage and arithmetic.

A threshold gating element is a circuit element providing an electrical output when the summation of applied electrical inputs exceeds a predetermined threshold value. In our copending application Serial Number 298,240, filed July 29, 1963, adder circuits including threshold gating elements are set forth and claimed employing a minimum number of components and characterized by minimum carry propagation time. According to the present invention a plurality of bistable elements, preferably of the threshold gating type, cooperate to form an adding accumulator capable of storing digital information until needed. In addition to storing information, this device also performs certain arithmetic functions including addition. In one mode of operation the accumulator functions whereby a number stored in the accumulator is added to a further applied input number after which the resulting sum is automatically stored in the accumulator. This and other arithmetic operations are performed in the accumulator itself without resort to extensive additional computer logic.

In accordance with a particular embodiment of the present invention the accumulator is formed of two banks or ranges of bistable circuits, there being a sum bistable circuit and a carry bistable circuit for each bit position. Both carry and sum bistable circuits receive, via feedback connections, the previous sum currently stored in the sum bistable circuit (while the carry bistable circuit also receives the carry currently stored therein as feedback. Each bistable circuit also receives lower ranking carry output from the carry bistable circuit representing the next lower ranking bit position, or similar information from lower rank bistable circuits in the accumulator. The accumulator according to the present invention is preferably formed of bistable circuits each including a pair of threshold gates as disclosed and claimed in our copending application Serial Number 322,349, filed September 17, 1963.

It is thus an object of the present invention to provide an improved accumulator or register capable of not only storing information but also capable of adding and performing other arithmetic functions in the same device.

The subject matter which we regard as our invention is particularly pointed out and distinctly claimed in the concluding portion of this specification. The invention, however, both as to organization and method of operation, together with further objects and advantages thereof may be best understood by reference to the following description taken in connection with the accompanying drawings wherein like reference characters refer to like elements and in which:

Figure 4:
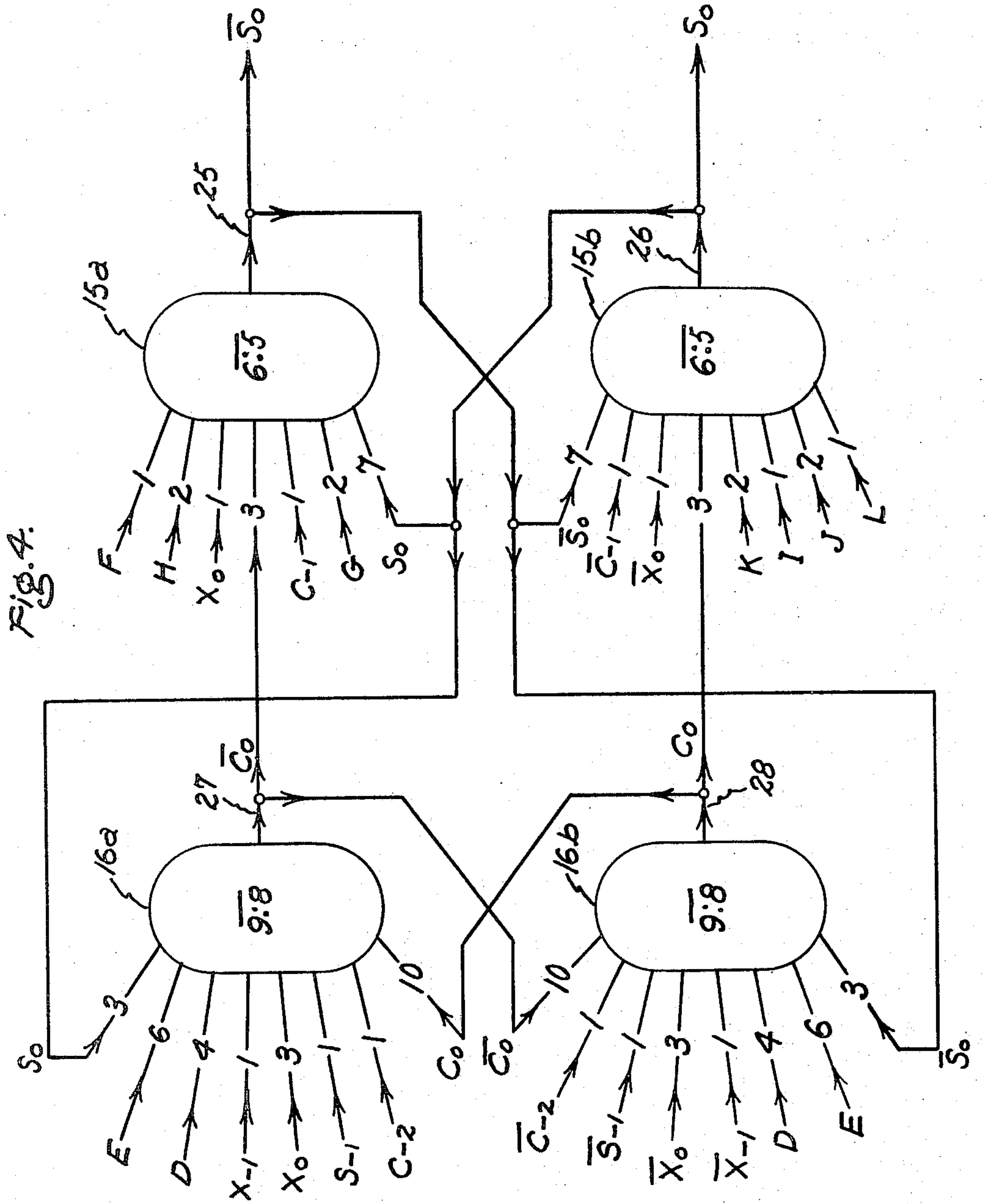
Figure 5:
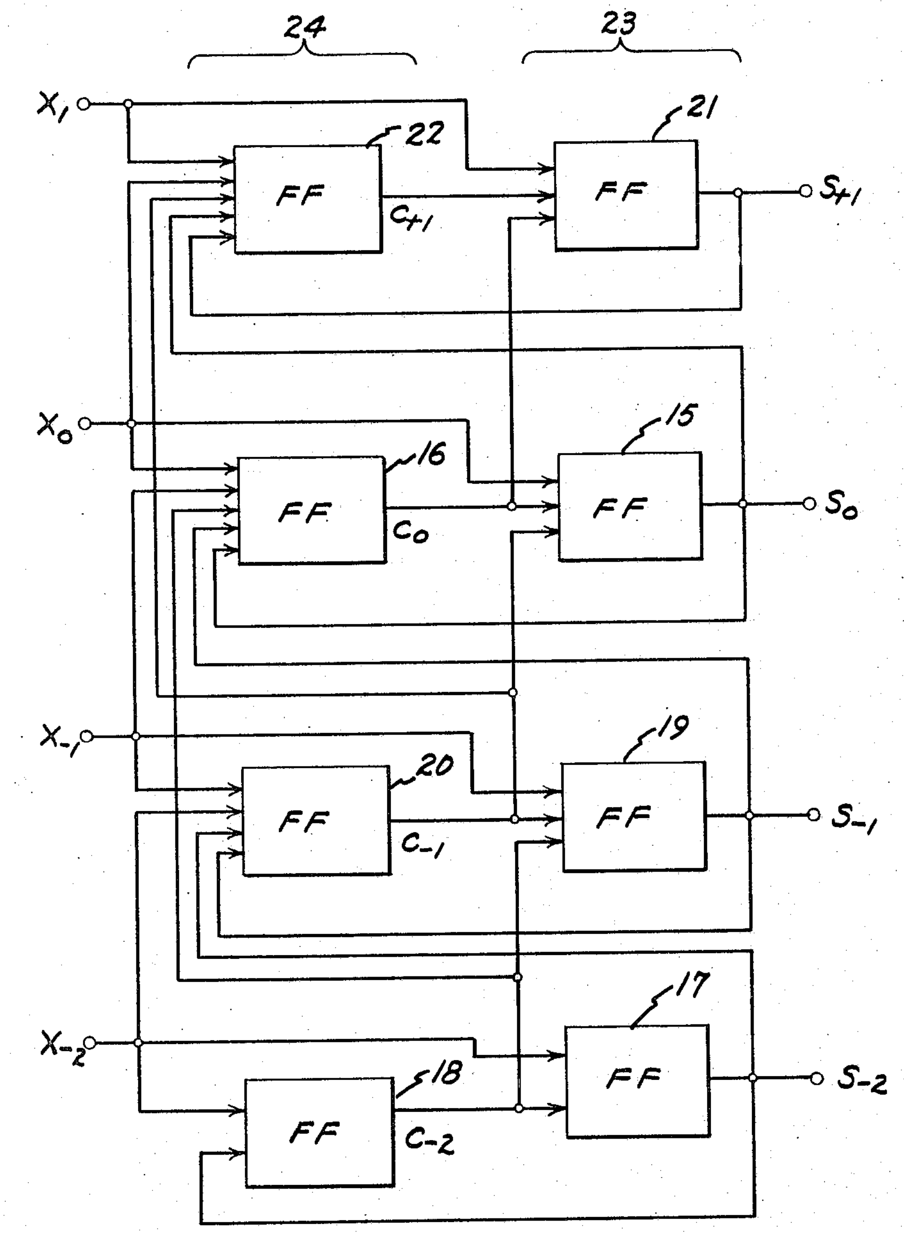
Figure 6:
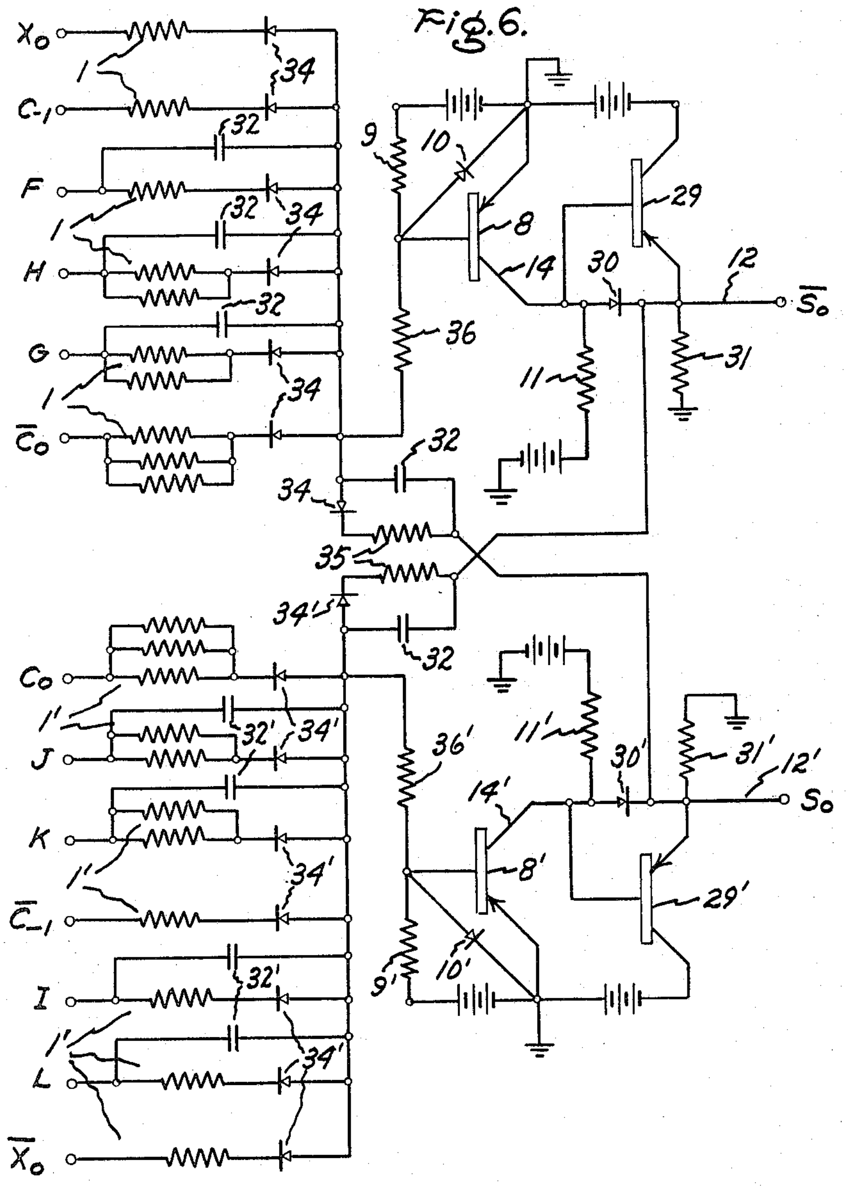
Figure 7:
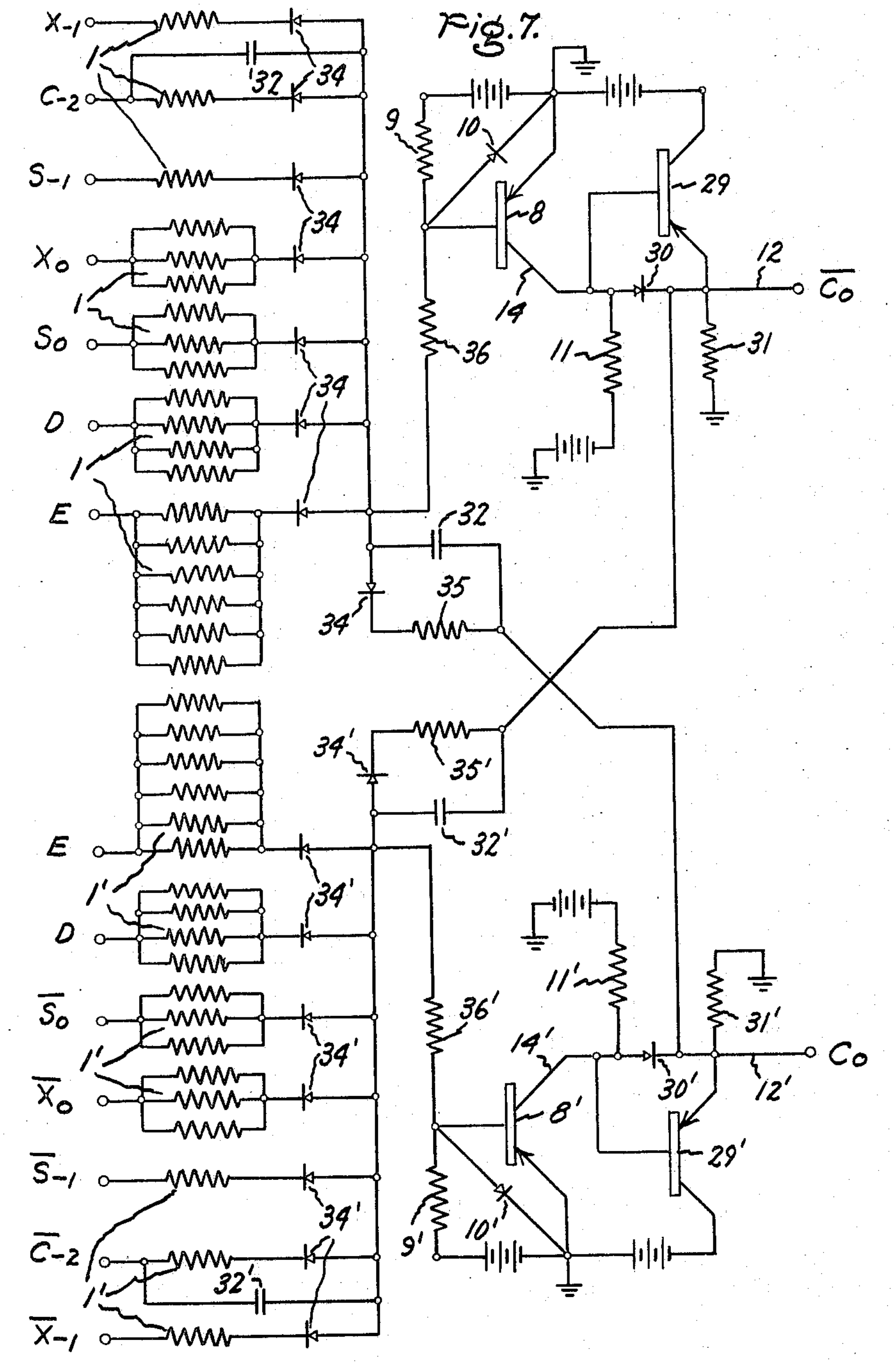

FIG. 4 is a diagram of a sum bistable circuit and a carry bistable circuit for one bit position employing threshold gates in accordance with one embodiment of the present invention, FIG. 5 is a block diagram of the accumulator in accordance with the present invention composed of sum and carry bistable circuits of the type illustrated in FIG. 4, FIG. 6 is a schematic diagram of a sum bistable circuit in accordance with the present invention, and FIG. 7 is a schematic diagram of a carry bistable circuit in accordance with the present invention, also employing threshold gates.

Figure 1:
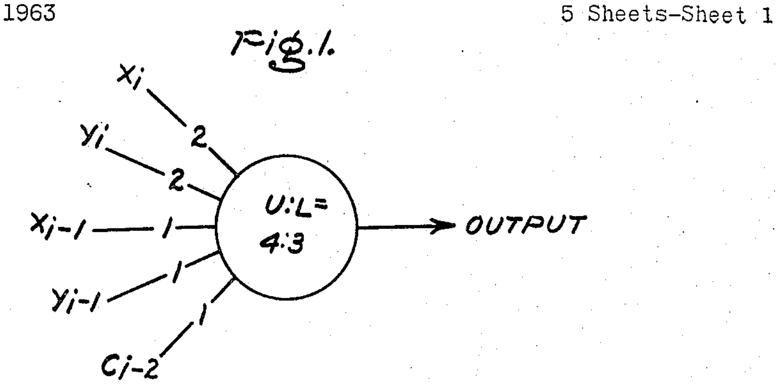
FIG. 1 is a basic representation of a threshold gate element.

A threshold element as utilized in accord with the present invention produces a binary one output when a function of its plurality of the indicated binary inputs exceeds a preset threshold value. Such a threshold element or gate may be represented as in FIG. 1 by a circle enclosing a ratio, *U:L*, of numbers which indicates the threshold "gap." The actual value of threshold is advantageously set to be within this gap. For the threshold element as illustrated in FIG. 1, having a "gap" equalling 4:3, four or more inputs of value one are required to produce an output, but three such inputs produce no output. Weights are given the inputs as indicated by numbers included in the input leads. A weight of two doubles the input so it has the same effect as two inputs of unity weight. Therefore one input of weight two, plus two inputs of weight one, will operate the gate.

In the gap ratio, the first number, U, is the smallest value of the summation of weighted inputs, $\Sigma a_i x_i$, for which $\Sigma a_i x_i$ exceeds the gate threshold, and L is the largest value for which $\Sigma a_i x_i$ is below the threshold. In the expression, $\Sigma a_i x_i$, $x_i$ indicates an input in the *i*th order digit position and $a_i$ indicates the weight applied to such input. The tolerance or allowable variation in component values (and threshold value) is related to the gap, and can be shown to equal $$\frac{U-L}{U+L}$$

It is apparent that a smaller gap results in a smaller or tighter tolerance in component values.

Figure 2:
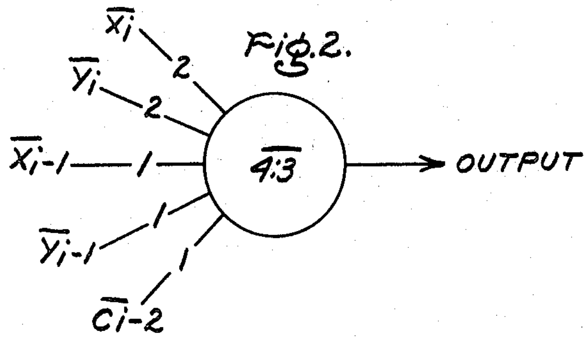
FIG. 2 is a basic representation of a complementing gate element.

FIG. 1 illustrates a straight non-complementing gate. FIG. 2 illustrates an equivalent complementing gate indicated by the bar over the gap numerals. When the sum of the inputs, $\Sigma a_i x_i$, applied to this gate exceed the threshold, the gates normally-on output is interrupted. Thus an inverse output is produced. In the FIG. 2 illustration, the inputs are also shown as complements. That is, an input signal current is applied to the particular input lead in the absence of the quantity given.

Figure 3:
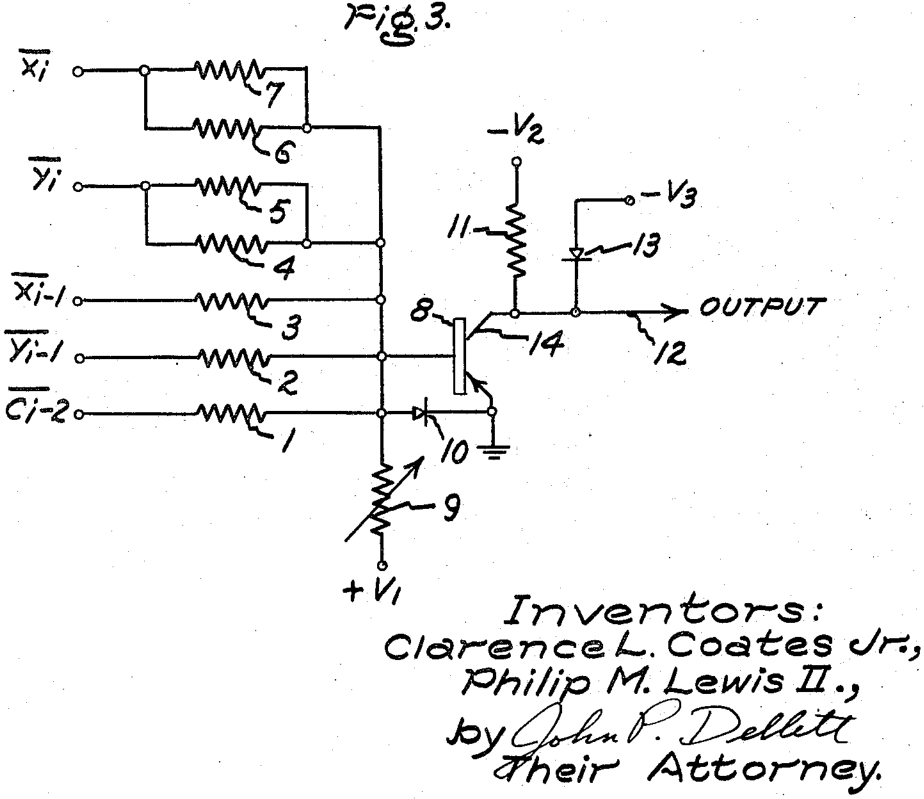
FIG. 3 is a schematic diagram of the threshold element of FIG. 2.

An example of a circuit diagram for a typical threshold gate element is illustrated in FIG. 3. The gate illustrated here is inherently a complementing threshold element; that is, a transistor amplifier connected in this manner produces an inverted output. For illustrative purposes, the FIG. 3 threshold gate is taken as an embodiment of the gate shown schematically in FIG. 2, having the same inputs and input weights.

The circuit illustrated in FIG. 3 produces a negative output voltage, taken as a binary one, when the summation of negative inputs, $\Sigma a_i x_i$, does *not* exceed the threshold setting. "No output," or a binary zero is produced when the summation of negative inputs, $\Sigma a_i x_i$, exceeds the threshold setting. The circuit comprises a transistor amplifier of grounded emitter configuration having a plurality of equal valued input resistors 1–7 connected between the input terminals and the transistor base 8. The input signals are taken as negative going in each instance. The resistors 1–7 have the same resistance for individually providing unit weight to negative polarity inputs applied thereto. Thus resistors 1, 2 and 3 provide unit weight for inputs designated $\overline{C}_{i-2}$, $\overline{y}_{i-1}$, and $\overline{w}_{i-1}$. However, resistors 4 and 5, connected in parallel, provide double unit weight to input $\overline{y}_i$, and the parallel combination of resistors 6 and 7 likewise provide double unit weight to $\bar{x}_1$, since a doubled flow of current may take place through the paralleled resistors in each case.

In the absence of sufficient input for exceeding the threshold, a diode 10 prevents base 8 from rising above ground level, while transistor collector 14, supplied a negative voltage $-V_2$ through resistor 11, is similarly prevented from becoming more negative than a voltage $-V_3$ by means of clamping diode 13. Thus the gate normally supplies a negative output current derived through the diode 13.

A threshold resistor 9, which is made conveniently variable, couples transistor base 8 to a source of positive voltage $V_1$. This resistor is used to determine the threshold of conduction for the transistor. The threshold resistor 9, jointly with input resistors 1–7, comprise a voltage divider having a mid point at the transistor base 8. In the absence of the prescribed summation of gate inputs required for exceeding the threshold, the voltage drop across threshold resistor 9 is insufficient to lower the transistor base from ground potential. However, when a number of inputs occur exceeding the preset threshold, these inputs collectively provide sufficient current through their input resistors for swinging the transistor base below ground and operate the transistor under saturation conditions. At this time, maximum collector-emitter current flows in the transistor establishing a voltage drop across load resistor 11 whereby output terminal 12 rises to a low value near ground level. Thus the output terminal 12 supplies the voltage equalling minus $V_3$ until the threshold is exceeded, at which time the output voltage rises to near zero. This particular circuit is therefore a complementing threshold circuit as indicated since an output is produced in the absence of inputs exceeding the gate threshold.

FIG. 4 illustrates circuitry comprising one bit position of an accumulator in accordance with the present invention. The circuitry includes a sum bistable circuit comprising threshold gates 15*a* and 15*b* and a carry bistable circuit comprising threshold gates 16*a* and 16*b*. The threshold gates of each bistable circuit are cross-connected to provide feedback in the manner set forth and claimed in our concurrently filed application Serial No. 322,349 assigned to the assignee of the present invention.

The sum bistable circuits and carry bistable circuits for successive bit positions are combined to form an array or accumulator in accordance with the present invention as illustrated in FIG. 5. For convenient reference the bistable circuits of FIG. 4 comprising a single bit position are numbered 15 and 16 in FIG. 5. In this register sum and carry bistable circuits 17 and 18 comprise the lowest order stage of the register, sum and carry bistable circuits 19 and 20 just precede the circuits of FIG. 4 in the register, and sum and carry bistable circuits 21 and 22 follow the FIG. 4 position in the register. The bistable circuits 15 and 16 are designated the zero bit position. The digit input to the register in this bit position is designated $X_0$ and the output sum, $S_0$ while the carry generated in carry bistable circuit 16 is $C_0$. The input and output values for lower and higher ranking bit positions are designated by subscripts including minus and plus signs respectively. Thus the input to the stage comprising bistable circuits 19 and 20 is $X_{-1}$, the output sum is $S_{-1}$ and the intermediate carry is $C_{-1}$.

The sum bistable circuits 15, 17, 19 and 21 comprise a bank or range 23 of bistable circuits, while carry bistable circuits 16, 18, 20 and 22 comprise a second bank or range 24 of bistable circuits. The accumulator of FIG. 5 is illustrated as a four bit register for illustrative purposes only. Also the number of interconnections shown in FIG. 5 has been halved for the sake of clarity. It will be noted from FIG. 4 that both complemented and non-complemented inputs and outputs are provided for each bit position, corresponding to the two gates of the pair, but only the non-complemented connections are shown on the FIG. 5 diagram. The manner of interconnecting the circuit of the accumulator will be further explained in connection with the drawing of FIG. 4.

Referring to FIG. 4, the sum bistable circuit of the illustrated embodiment comprises two threshold gates 15*a* and 15*b* each having a gap of $\overline{6{:}5}$. The output lead 25 of threshold gate 15*a* is feedback coupled as an input to threshold gate 15*b* with a weight of 7. Similarly, output lead 26 of threshold gate 15*b* is cross-connected as an input to gate 15*a* with a weight of 7. As thus appears, the presence of an output on either lead 25 or 26 will be sufficient to exceed the threshold of the opposite threshold gate via the feedback connection inasmuch as weighting at each threshold gate exceeds the threshold gap. Moreover, each of the threshold gates are complementing; thus output lead 25 actually supplies output voltage in the absence of inputs exceeding the gate's threshold, and the same can be said of output 26 from gate 15*b*. Therefore in the absence of inputs exceeding the threshold of either gate, one gate will provide an output exceeding the threshold of the opposite gate to prevent an output from that opposite gate. Such condition will be maintained until inputs exceeding the threshold are applied to the first gate; i.e., when inputs exceeding the threshold of gate 15*a* are applied thereto acting to "set" or "operate" this gate, the output on lead 25 is concluded permitting an output to occur on lead 26. The voltage then present on lead 26, coupled with the weight of 7 to gate 15*a*, will then maintain the condition until the inputs of gate 15*b* exceed the threshold thereof. The term "resetting" is herein taken to mean operation of one gate by the other, i.e., operation of the complement producing gate by the non-complemented output or vice versa.

Gate 15*a* provides the output designated $\bar{S}_0$, that is a complemented output, at lead 25, while gate 15*b* provides the uncomplemented output, $S_0$, at lead 26. The bistable circuit comprising gates 15*a* and 15*b* functions in one instance to add a new input digit $X_0$ to $S_0$, the latter digit being previously stored as a bistable state of the bistable circuit comprising gates 15*a* and 15*b*. That is, when an output appears on output lead 26, and none upon output lead 25, a stored bit $S_0$ is present in storage for possible addition or comparison to $X_0$.

The input $X_0$ receives a weight of 1 at gate 15*a*. Similarly, $C_{-1}$, the carry from the next lower order bit position in the register, also receives a weight of 1, while the complement of the carry from the same bit position in the register, $\bar{C}_0$, obtained from gate 16*a*, receives a weight of 3 at gate 15*a*. Each of these inputs are called "setting" inputs, although a combination on inputs exceeding the threshold is required to operate or set the gate. Inputs H and G each receiving a weight of 2, and F receiving a weight of 1, are control inputs, but only one of these, H, is energized during addition.

It is thus seen both the carry output from the carry bistable circuit in the first bank in the same digit position, and in the next lower digit position, provide inputs to the sum bistable circuit in the second bank, but the outputs from the next lower digit position are reversed; i.e. the complemented carry of lower rank is applied as an input to the sum gate furnishing the non-complemented sum output and vice versa.

$\bar{X}_0$ and $\bar{C}_{-1}$ are each supplied with a weight of 1 at opposite gate, 15*b*, while $C_0$ receives a weight of 3. Control inputs K and J each receive a weight of 2 and control I and L each receive a weight of 1, but only control input K is energized during addition.

The accumulator of the present invention functions to add, in parallel fashion, a number X to a number S, already stored in the accumulator, for producing a new sum, S, which then replaces the previous number in storage. Addition takes place during two time periods, a first to produce and store a carry digit in the carry bistable circuit for each digit position, and a second time period for producing and storing a sum in the sum bistable circuit for each corresponding digit position. Control input D is present in the first time period, and H and K in the second. The sum operation will be described first for clarity of explanation.

The accumulator circuit operates in accordance with the following truth table to provide the digits of a correct output sum.

*Table I*

| $X_0$ | $S_0$ | $C_{-1}$ | $C_0$ | $S_0$ (new) |
|---|---|---|---|---|
| 1 | 1 | 1 | 1 | 1 |
| 1 | 1 | 0 | 1 | 0 |
| 1 | 0 | 1 | 1 | 0 |
| 1 | 0 | 0 | 0 | 1 |
| 0 | 1 | 1 | 1 | 0 |
| 0 | 1 | 0 | 0 | 1 |
| 0 | 0 | 1 | 0 | 1 |
| 0 | 0 | 0 | 0 | 0 |

An output S or sum digit equalling 1 is produced on lead 26 when any of the prescribed conditions of the truth table are met. Thus, if only one of the quantities $X_0$, $S_0$ or $C_{-1}$ is present, then $\overline{C}_0$ will be supplied with a weight of 3 as an input to gate 15*a*, in a manner hereinafter described. Thus $\overline{C}_0$ with a weight of 3 plus either $X_0$ or $C_{-1}$ with a weight of 1, and control input H of weight 2, supplied at the second time period, will exceed the threshold and set or operate gate 15*a*. The output on lead 25, if present, will disappear allowing an output to appear on lead 26 indicating the presence of $S_0$. The circuit will continue to provide this indication, thus storing the sum value. Of course if the bistable circuit already stores a value of 1, then the feedback $S_0$ having a weight of 7 maintains the status of the gate unchanged.

If from the quantities $X_0$, $S_0$ and $C_{-1}$, two but not three are present, then in accordance with the truth table, no output $S_0$ should be delivered. In such case output $\overline{C}_0$ will be absent from lead 27, $C_0$ being provided as a signal on lead 28 in a manner hereinafter described. On gate 15*a*'s input leads, the addition of weight 2 for control signal H, and 1 for either one or both $X_0$ and $C_{-1}$, will not exceed the threshold; therefore no sum $S_0$ will be provided. However if $S_0$ is present as previously stored, then apparently it would exceed the threshold of gate 15*a* because of the feedback weight, 7. However $C_0$ present on lead 28 is applied with a weight of 3 to gate 15*b*, and when added to control input K of weight 2 present in this time period, and either one of the quantities $\overline{X}_0$ and $\overline{C}_{-1}$, it will exceed the threshold of gate 15*b*, thus discontinuing the presence of $S_0$ and attendant feedback. $\overline{S}_0$ is now stored.

The only remaining case is the instance when all three inputs $X_0$, $C_{-1}$ and $S_0$ are present at the same time, whereby a new sum $S_0$ should be generated. In this instance the presence of $S_0$ provides feedback to hold the bistable circuit in the output generating condition. The output will not be disabled by means of gate 15*b* inasmuch as neither $\overline{C}_{-1}$ nor $\overline{X}_0$ is present and the threshold of gate 15*b* will therefore not be exceeded.

It is thus seen the sum bistable circuit acts to change its position only when necessary to provide the correct sum between the digit already stored and a new digit $X_0$. The circuit operation of gate 15*a* may be described according to the Boolean expression: $\overline{C}_0(X_0\dot{+}C_{-1})$, $\dot{+}$ meaning logical "or," while the operation of gate 15*b* is similar with complemented variables replaced by uncomplemented variables and vice versa. Alternatively, the operation may be viewed as that of adding the feedback to the new digit $X_0$ according to the expression:

$$\overline{C}_0(X_0\dot{+}C_{-1}\dot{+}S_0)+X_0C_{-1}S_0$$

where $S_0$ is the feedback.

The "carry" for each bit position, $C_0$, and its complement $\overline{C}_0$ are generated at output leads 28 and 27 of carry gates 16*b* and 16*a*. Gate 16*a* and gate 16*b* are cross-connected to provide resetting feedback in the same manner as gates 15*a* and 15*b*, whereby the two comprise a bistable circuit. The feedback is given a weight of 10 whereby it is always capable of exceeding the gate's threshold. Carry gate 16*a* has applied thereto control signals D and E having weights of 4 and 6, respectively, only D being present in the first time period for adding, as well as input $X_{-1}$ with a weight of 1, $X_0$ with a weight of 3, $S_{-1}$ with a weight of 1, and $C_{-2}$ with a weight of 1. $S_0$ from output lead 26 of sum gate 15*b* is applied as an input to carry gate 16*a* with a weight of 3. It is seen the sum output leads are cross-coupled to inputs of gates 16*a* and 16*b* in a manner similar to the feedback cross-connection of gates within a bistable circuit, whereby a "resetting" configuration is realized. In this arrangement, the complemented sum is provided as an input to the carry gate for producing the uncomplemented carry, and the uncomplemented sum is coupled as an input to the carry gate providing the complemented carry. Basically this circuit operates to indicate a carry when there is present at least two of the quantities $X_0$, $S_0$ (the previous sum stored) and $C_{-1}$. The presence of the latter quantity is herein indicated by the presence of any two of the quantities $X_{-1}$, $S_{-1}$ and $C_{-2}$. It is seen the presence of only two of the required signals described for generating a carry are necessary to exceed the threshold of carry gate 16*a* having the gap $\overline{9:8}$. The inputs of the remaining carry gate 16*b* are substantially the complements of those applied to carry gate 16*a*, with the exception of control signals.

It is characteristic of the bistable circuit comprising carry gates 16*a* and 16*b* that the condition of the outputs $C_0$ and $\overline{C}_0$ are determined completely by the inputs, whereby $C_0$ is generated only if at least two of the required quantities are present but $\overline{C}_0$ is generated if only one of these is present. This characteristic is attributable to the weighting given the inputs applied to gate 16*a* and the complementary inputs applied to gate 16*b* relative to the thresholds so that the inputs applied are completely determinative of the output condition. For any combination of inputs one or the other threshold will be exceeded. This condition is not desirable for sum gates 15*a* and 15*b*. In the latter instance, as previously described, the inputs applied to the gates are effective to change the outputs $S_0$ and $\overline{S}_0$ only if a sum would be generated different from that in storage.

In the present accumulator as in the parallel adder described and claimed in our copending application Serial No. 298,240 carry propagation is not required throughout the stages of the accumulator but may be present only between groups of stages. Thus a bistable circuit comprising a carry gate 16*a* and 16*b* need not await the carry $C_{-1}$ from the just previous stage 19–20, to begin operation. As indicated in FIG. 4, and as further indicated in FIG. 5, the carry gates 16*a* and 16*b* make use of the carry two stages previous as well as the digits being added in the just previous digit position. The latter feature, although desirable in aiding the speed of operation, it is not strictly necessary to the present invention. Thus, inputs $X_{-1}$, $S_{-1}$ and $C_{-2}$ can be replaced with an input having a value $C_{-1}$ and given a weight of two. The complement inputs supplied to gate 16*b* are similarly replaceable with the complement of the carry from the immediately lower order digit position. As in the instance of the adder set forth and claimed in our copending application Serial No. 298,240, the carry for a given digit position is determined first, during a first time period, after which the sum gates determine the sum $S_0$ in a second time period.

The accumulator according to the present invention is thus seen to perform the arithmetic function of adding as well as that of storing the numbers added. Moreover only four gates are employed per bit position, a number much smaller than heretofore required. However, the accumulator is not restricted to the arithmetic function of adding but may also perform the functions "and," "or," "clear," "clear and add," "complement" and "shift." The logical function realized by the accumulator and the results stored therein can be controlled by changing the electrical control inputs to the accumulator. Thus the accumulator provides electrically controllable logic. The various control signals, in combination with desired input signals, act to gate in these input signals to operate the gate by exceeding its threshold in combination with control inputs.

In the "and" operation the number in storage is replaced by the bit-by-bit logical "and" of that number and the input number. The "and" operation takes only one time period. Control inputs D, E, I, J, and K are energized and the other control inputs are not energized. The outputs of gates 16*a* and 16*b* are thereby both set equal to zero. Then if $X_0=0$ (and $\overline{X}_0=1$), the output of the sum bistable circuit is set to $S_0=0$, $\overline{S}_0=1$. If on the other hand, $X_0=1$ (and $\overline{X}_0=0$), the output of the sum bistable circuit will remain unchanged. It is apparent this method of operation corresponds to logical "and" operation.

The "or" operation also takes place during one time period. Control inputs D, E, H, F and G are energized while all other control inputs are left unenergized. Again the outputs of both gates 16*a* and 16*b* are zero. Then if $X_0=1$ ($\overline{X}_0=0$), the output of the sum bistable circuit is $S_0=1$, $\overline{S}_0=0$, while if $X_0=0$ ($\overline{X}_0=1$), the output of the sum flip flop remains unchanged. It is readily verified that this output corresponds to the "or" operation.

The operation "clear" takes place in one time period. Control inputs I, J, K and L are energized. This sets the output of the sum bistable circuit to zero, i.e., $S_0=0$, $\overline{S}_0=1$. Clear and add is the same as add except that in the first time period, in addition to energizing control input D, control inputs I, J, K and L are also energized to clear the sum bistable circuit while the carry is being calculated. Then during the second time period the new sum is stored in the sum bistable circuit.

The "complement" operation takes two time periods. During both time periods the X and $\overline{X}$ inputs are set equal to zero. During the first time period, control input E is energized and the other control inputs are set equal to zero. The outputs of the carry bistable circuits, $\overline{C}_0$ and $C_0$, become $\overline{S}_0$ and $S_0$, respectively. This will occur since control input E is effective to gate the $S_0$ and $\overline{S}_0$ inputs into gates 16*a* and 16*b*. During the second time period, control inputs H, F, I and K are energized. The carry bistable circuit remains unchanged. The inputs to the sum gates 15*a* and 15*b*, $\overline{C}_0$ and $C_0$, produce the reverse outputs on leads 25 and 26 to those appearing there before. It is apparent the complement is accomplished by transferring the contents of the sum bistable circuit to the carry bistable circuit and back again, since the connections are reversed or cross-connected.

The shift operation takes two time periods; in both time periods X and $\overline{X}$ inputs are zero. The first time period is again the same as for the operation "complement." That is, the contents of the sum bistable circuit are transferred to the carry bistable circuit so that the outputs $\overline{C}_0$ and $C_0$ become $\overline{S}_0$ and $S_0$, respectively. During the second time period, control inputs H and K are energized and the other control inputs are set equal to zero. The carry bistable circuit does not change. If $S_{-1}$ (which is now $C_{-1}$) differs from $S_0$ (which is now $C_0$) then $S_{-1}$ will be stored in the sum bistable circuit accomplishing the shift operation from the lower ranking digit position. If $S_0$ is the same as $S_{-1}$ then of course no change is necessary. The shift is accomplished since the control inputs H and K are sufficient to permit coupling of the lower ranking carry into the sum gates.

FIGS. 6 and 7 are complete schematic diagrams of a sum bistable circuit and a carry bistable circuit, respectively. Since these circuit details are a variation of the circuit illustrated in, and described in connection with FIG. 3, the circuits need not be redescribed. Like reference numerals refer to like components with the principal changes herein noted. Primed numbers are applied to components of the gate receiving complemented inputs. In FIGS. 6 and 7 additional transistor amplifiers 29 of emitter follower configuration are interposed between output terminals 12 and the previous transistor for the purpose of lowering output impedance and obtaining greater drive. Output resistors 31 return the respective emitters to ground. Diodes 30 act to prevent the output from falling below ground when these transistors 29 are not driven.

Input resistors 1 of equal value determine by their resistances in parallel, the weight given the various designated inputs. In some cases the resistors are shunted employing capacitors 32 in order to improve the rise-time response of the input circuit. Diodes 34 insure against back currents in resistors 1 even when the parallel resistance of all resistors 1 is relatively small. Resistors 36 prevent curent flow in the diodes 34 when the input voltage is near zero. Each feedback connection includes a resistor 35 having an appropriate fraction of the resistor 1 value in order to give the feedback greatest input weight. Thus in FIG. 6 resistors 35 will have a resistance approximately 1/7 that of resistor 1 while in the circuit of FIG. 7, resistors 35 will have a resistance of about 1/10 the resistor 1 value to attain weights of 7 and 10 respectively.

While we have shown and described several embodiments of our invention, it will be apparent to those skilled in the art that many changes and modifications may be made without departing from our invention in its broader aspects; and we therefore intend the appended claims to cover all such changes and modifications as fall within the true spirit and scope of our invention.

What we claim as new and desire to secure by Letters Patent of the United States is:

1. A digital accumulator comprising first and second banks of bistable circuits wherein each digit position includes a bistable circuit from each bank with the bistable circuit from the first bank providing a setting input to the bistable circuit of the second bank and the bistable circuit of the second bank providing a resetting input to the bistable circuit of the first bank, and means coupling as an input to bistable circuits of the second bank the output of the first bank bistable circuit for the next lower digit position.

2. A digital accumulator comprising a first bank of bistable circuits, and a second bank of bistable circuits whose states represent the digits stored in said accumulator, each digit position of said accumulator including a bistable circuit from each bank with the bistable circuit from the first bank in said digit position providing an input to the bistable circuit of the second bank and the bistable circuit of the second bank providing a complementary input to the bistable circuit of the first bank, means coupling as an input to bistable circuits of the second bank the output of the first bank bistable circuit for the next lower digit position, and coupling means receiving digital inputs to said accumulator and for applying the same to bistable circuits of each bank in corresponding digit positions.

3. A digital accumulator comprising first and second banks of bistable circuits and including a bistable circuit from each bank corresponding to each digit position of the accumulator, said bistable circuits comprising cross-connected threshold gates having input connections and feedback connections for weighting amplitude of each individual signal applied thereto and summing the weighted amplitudes of said individual signals, said feedback connections receiving sufficient weight at the input of each said threshold gate to individually actuate said gate in the presence of a feedback signal, each bistable circuit from the first bank providing outputs for application to each gate of the second bank bistable circuit in the same digit position, means cross-connecting complementary outputs of bistable circuits in the second bank to the threshold gates forming the first bank bistable circuit in the same digit position, and means coupling an input of threshold gates forming the bistable circuit in the second bank to complementary outputs of a bistable circuit of the first bank in the next lower digit position.

4. A digital accumulator comprising: first and second banks of bistable devices, each said bistable device comprising cross-connected gate circuits, said first and second banks including a sum bistable device respectively and a carry bistable device respectively for each digit position in the accumulator; and means applying as inputs to said sum bistable device the output of the carry bistable device in the same digit position, the output of the carry bistable device for the next lower digit position, and a digit being added to the accumulator in said same digit position; wherein the sum bistable device retains a given stable state indicating the sum until the logical combination of said inputs indicates a differing sum.

5. The accumulator according to claim 4 wherein the gate circuits of said sum bistable circuit comprising means for combining $\overline{C}_0$, $C_{-1}$ and $X_0$ according to the Boolean expression:

$$\overline{C}_0(X_0+C_{-1})$$

wherein $\overline{C}_0$ and $C_{-1}$ are the carries in the same and next lower ranking digit position and $X_0$ is the input digit being added.

6. A digital accumulator comprising: first and second banks of bistable circuits; said bistable circuits comprising cross-connected threshold gates including a sum bistable circuit and a carry bistable circuit for each digit position in the accumulator; means applying as inputs to said sum bistable circuit the output of the carry bistable circuit in the same digit position, the input for addition to the digit stored, and the carry output from the carry bistable circuit of the next lower digit position; wherein the sum bistable circuit retains a given stable state indicating the sum unless the logical combination of said inputs indicates a differing sum; said carry bistable circuit receiving as inputs the digit being added, the previous sum stored, and information indicative of a previous carry in a lower order digit position.

7. The apparatus according to claim 6 wherein said threshold gates also receive a control input and have predetermined threshold values rendering them responsive to carry and sum logic when additionally energized by said control input, but where each signal furnished from one threshold gate to a complementary cross-connected threshold gate within each of said bistable circuits is weighted at said complementary gate to an amplitude exceeding the predetermined threshold value of said complementary gate is weighted so that application of a signal to any of said feedback connections produces a signal of amplitude exceeding the predetermined.

8. A digital accumulator comprising first and second banks of bistable circuits wherein each digit position includes a bistable circuit from each bank, each bistable circuit comprising a pair of threshold gates including a first threshold gate providing an uncomplemented output and a second threshold gate providing a complemented output for the same digit position, a feedback cross-connection between a pair of said gates in the second bank forming a bistable circuit for a given digit position, a feedback cross-connection between a pair of said gates in the first bank forming a bistable circuit for said given digit position wherein the uncomplemented output from the second bank bistable circuit for said given digit position is coupled as an input to the first bank gate producing a complemented output for said given digit position and wherein the complemented output from the second bank bistable circuit for said given digit position is coupled as an input to the gate of the first bank providing the uncomplemented output for said given digit position, means coupling the uncomplemented output of the bistable circuit from the first bank for said given digit position as an input to the gate providing an uncomplemented output from the bistable circuit for said given digit position in the second bank, means coupling the complemented output of the bistable circuit for said digit position in the first bank as an input to the gate providing a complemented output from the bistable circuit for said given digit position in the second bank, means coupling control inputs to said gates effective to operate said gates in combination with selected of the inputs thereto including the said cross-connections, and coupling means for providing an input digit to the gates for said given digit position, said input digit for said given digit position being applied in non-complemented form to the gates of said given digit position producing a complemented output and being applied in complemented form to the gates of said given digit position providing an uncomplemented output.

9. The accumulator according to claim 8 having control inputs effective in combination with the complemented digit input to the gate providing the uncomplemented output of the second bank bistable circuit for said given digit position, for exceeding the threshold of said last-named gate and causing the output of said last named gate to be zero when the applied input digit is zero in order to provide a bit by bit "and" operation.

10. The accumulator according to claim 9 having control inputs effective in combination with the uncomplemented digit input to the gate providing the complemented output of the second bank bistable circuit for said given digit position, for exceeding the threshold of said last-named gate and causing the output of said last-named gate to be zero when the applied input digit is one in order to provide a bit by bit "or" operation.

11. A digital accumulator comprising first and second banks of bistable circuits wherein each digit position includes a bistable circuit from each bank, said bistable circuits including threshold gates providing complementary outputs and having cross-connected feedback connections, the bistable circuits from the first bank providing complementary outputs coupled as inputs to the gates of the second bank bistable circuit in the same digit position, means cross-connecting complementary outputs of a bistable circuit in the second bank to the threshold gates forming the first bank bistable circuit in the same digit position, means providing control inputs to said gates of the first bank to gate the bit stored in the second bank into the first bank in reverse order through the intermediate cross-connection, and means providing control inputs to the gates of the second bank to gate information from said first bank bistable circuits back into said second bank via the coupling therebetween, in order to provide a complement operation.

12. A digital accumulator comprising first and second banks of bistable circuits wherein each digit position includes a bistable circuit from each bank, said bistable circuits including threshold gates providing complementary outputs and having cross-connected feedback connections, bistable circuits from the first bank providing complementary outputs coupled as inputs to the gates of the second bank bistable circuit in the same digit position, means cross-connecting complementary outputs of a given bistable circuit in the second bank to the threshold gates forming the first bank bistable circuit in the same digit position, means providing control inputs to said gates of the first bank to gate the bit stored in the second bank into the first bank in reverse order by virtue of the intermediate cross-connection, means cross-coupling inputs of the threshold gates forming said given bistable circuit in the second bank to complemented outputs of the bistable circuit in the first bank in the next lower digit position, and means providing a control input to the gates of the said given second bank bistable circuit effective in combination with the aforementioned inputs applied thereto for altering the output of the second bank bistable circuit upon the coincidence of the input from the next lower digit position and the complement of the input from the first bank bistable circuit in the same digit position in order to provide shifting of information from a lower to a higher order digit position.

References Cited by the Examiner

UNITED STATES PATENTS

| | | | |
|---|---|---|---|
| 2,941,721 | 6/1960 | Schart | 235—175 |
| 3,139,603 | 6/1964 | Crane | 340—174 |

MALCOLM A. MORRISON, *Primary Examiner.*

K. MILDE, *Assistant Examiner.*